United States Patent
Ji et al.

(10) Patent No.: US 9,665,927 B2
(45) Date of Patent: May 30, 2017

(54) METHOD AND APPARATUS OF MULTI-FRAME SUPER RESOLUTION ROBUST TO LOCAL AND GLOBAL MOTION

(71) Applicants: Zhengping Ji, Temple City, CA (US); Qiang Zhang, Pasadena, CA (US); Lilong Shi, Pasadena, CA (US); Ilia Ovsiannikov, Studio City, CA (US)

(72) Inventors: Zhengping Ji, Temple City, CA (US); Qiang Zhang, Pasadena, CA (US); Lilong Shi, Pasadena, CA (US); Ilia Ovsiannikov, Studio City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 60 days.

(21) Appl. No.: 14/868,381

(22) Filed: Sep. 28, 2015

(65) Prior Publication Data

US 2016/0358314 A1 Dec. 8, 2016

Related U.S. Application Data

(60) Provisional application No. 62/170,671, filed on Jun. 3, 2015.

(51) Int. Cl.
*G06K 9/00* (2006.01)
*G06T 3/40* (2006.01)
(Continued)

(52) U.S. Cl.
CPC .......... *G06T 3/4069* (2013.01); *G06K 9/4671* (2013.01); *G06T 5/002* (2013.01);
(Continued)

(58) Field of Classification Search
CPC ......... G06T 3/4069; G06T 3/24; G06T 7/208; G06T 5/002; G06T 7/0038;
(Continued)

(56) References Cited

U.S. PATENT DOCUMENTS

| 6,580,792 B1 * | 6/2003 | Li ........................ H04Q 1/4575 370/210 |
| 6,766,067 B2 * | 7/2004 | Freeman ............... G06T 3/4053 348/441 |

(Continued)

OTHER PUBLICATIONS

Kanaev et al., Multi-frame super-resolution algorithm for complex motion patterns, 2013, Optical Society of America.*

(Continued)

*Primary Examiner* — John Strege
(74) *Attorney, Agent, or Firm* — Renaissance IP Law Group LLP

(57) ABSTRACT

A method for enhancing at least one image within a series of images is provided. The method includes: selecting the series of images; upscaling each image within the series of images; selecting a reference image among the series of images; performing image registration to align series of images with the reference image; evaluating the series of aligned images for a subset of pixel locations that exhibit high cross-frame variation; performing learning processing to substantially reduce noise and exclude motion biases at the subset of pixel locations; performing pixel fusion from the series of aligned and processed images to produce the super-resolution reference image. A computer program product and an imaging system are disclosed.

20 Claims, 11 Drawing Sheets

(51) Int. Cl.
*G06T 5/00* (2006.01)
*G06T 7/20* (2017.01)
*G06T 7/00* (2017.01)
*G06K 9/46* (2006.01)
*H04N 5/345* (2011.01)
*H04N 19/36* (2014.01)

(52) U.S. Cl.
CPC ............ *G06T 7/0038* (2013.01); *G06T 7/208* (2013.01); *H04N 5/3454* (2013.01); *H04N 19/36* (2014.11); *G06T 2207/20224* (2013.01)

(58) Field of Classification Search
CPC .......... G06T 2207/20224; H04N 19/36; H04N 5/3454; G06K 9/4671
See application file for complete search history.

(56) References Cited

U.S. PATENT DOCUMENTS

| | | | | |
|---|---|---|---|---|
| 8,254,726 | B2 * | 8/2012 | Ichihashi | G06T 3/403 375/240.16 |
| 8,537,278 | B1 * | 9/2013 | Bozinovic | H04N 19/51 348/451 |
| 8,682,109 | B2 * | 3/2014 | Kang | G06T 3/4053 345/698 |
| 9,117,262 | B2 * | 8/2015 | Lin | G06T 5/002 |
| 9,342,871 | B2 * | 5/2016 | Molgaard | G06T 5/50 |
| 2009/0245375 | A1 * | 10/2009 | Liu | G06T 3/4053 375/240.16 |
| 2012/0051667 | A1 * | 3/2012 | Kang | G06T 3/4053 382/299 |
| 2012/0218442 | A1 * | 8/2012 | Jandhyala | G06T 7/20 348/239 |
| 2012/0300122 | A1 * | 11/2012 | Liu | H04N 7/0137 348/441 |
| 2013/0148872 | A1 * | 6/2013 | Aisaka | A61B 3/12 382/128 |
| 2014/0193032 | A1 * | 7/2014 | Zhang | G06T 3/0012 382/103 |
| 2014/0293074 | A1 * | 10/2014 | Joshi | G06T 3/4038 348/208.6 |

OTHER PUBLICATIONS

Hardie et al. Fast super-resolution using an adaptive Wiener filter with robustness to local motion, 2012, Optical Society of America.*

* cited by examiner

201

202

203

Local motion
Image series - 200

301

302

303

Global motion
Image series - 300

METHOD AND APPARATUS OF MULTI-FRAME SUPER RESOLUTION ROBUST TO LOCAL AND GLOBAL MOTION

BACKGROUND

Field

The technology disclosed herein relates to image processing, and in particular, to techniques for super resolution techniques that account for global and local motion.

Description of the Related Art

A number of technologies rely on image data to accomplish their goals. For example, medical diagnostics, surveillance, forensic and satellite imaging applications make heavy use of imaging data. Efficacy of technologies that rely on imaging data can be improved by improving the underlying image quality. In some instances, this may be accomplished by improving the associated imaging hardware. For example, improvements in sensors as well as optics can yield higher-quality images. However, hardware improvements are not always possible. In some cases, the cost benefit analysis simply rules out the use of better hardware. In some other cases, better hardware is not available. Accordingly, image analysis techniques may be used to provide for enhanced images.

Super resolution (SR) is a technique to generate a higher resolution image or image sequence from a low resolution (noisy) image or image sequence of a scene. Higher resolution image offers a higher pixel density and thereby more details about the original scene. Generally, super resolution (SR) makes use of a series of related images to enhance content within a given image. In simple terms, super resolution (SR) relates one image to related data in a series of subsequent and/or preceding images and improves representations of the image according to the related data.

In many instances, super resolution (SR) can make dramatic improvements to image quality. This is particularly the case where the imaging sensor is stationary relative to a subject, and the subject is substantially static (i.e., there is no movement within the scene that is being imaged).

Unfortunately, such constraints rarely present themselves. For example, in medical imaging, a subject may move some as they shift positions while imaging. In security applications, such as where a sensor is used to image a landscape that includes, for example, people walking on the street, the subjects moved throughout the sequence of images. Additionally, sensors used in applications such as the security application may be subject to vibration, such as from wind buffeting the housing in which the sensor is mounted.

As a result, many image sequences contain global movement (i.e., movement of the sensor relative to the sensing area) as well as local movement (i.e., movement within the sensing area). As a result, efficacy of super resolution (SR) techniques often does not perform nearly as well in real-world conditions when compared to laboratory or test conditions.

Thus, what are needed are improved techniques for super resolution (SR). The techniques should provide for reducing the effect of global motion and local motion upon output images.

SUMMARY

In one embodiment, a method for enhancing at least one image (referred to as a "reference image") within a series of images is provided. The method includes: selecting the series of images; upscaling each image within the series of images; selecting a reference image among the series of images; performing image registration to align series of images with the reference image; evaluating the series of aligned images for a subset of pixel locations that exhibit high cross-frame variation; performing learning processing to substantially reduce noise and exclude motion biases at the subset of pixel locations; performing pixel fusion for the series of aligned and processed images to produce the super-resolution reference image.

The series of images may include two or more sequential images. Image registration may include correlating at least some of the pixels of a reference frame with at least some of the pixels of a target frame; and may further include correlating at least one property of the selected pixels from a reference frame with at least one property of the selected pixels from a target frame; the at least one property may include scale-invariant feature transform (SIFT)—a local descriptor based on a key point and its neighborhood. Performing scale-invariant feature transform (SIFT) may include assigning a plurality of keypoints to each image in the series of images. Correlating SIFT properties of a reference frame to SIFT properties of a target frame may include the method called SIFT flow. Evaluating the series of aligned images for a subset of pixel locations that exhibit high cross-frame variation may include determining a deviation of pixels aligned at each location, and comparing the result to a threshold; the deviation may include a mean square distance to the median of one or more pixel channels. The learning processing to substantially reduce noise and exclude motion biases at the subset of pixel locations may include performing unsupervised K-means learning. Performing pixel fusion for the series of aligned and processed images may include mean and/or median filtering across frames.

In another embodiment, a computer program product stored on non-transitory machine readable media is provided. The computer program product includes machine executable instructions for implementing a super resolution by executing a method for enhancing at least one image within a series of images, the method including: selecting the series of images; upscaling each image within the series of images; selecting a reference image among the series of images; performing image registration to align series of images with the reference image; evaluating the series of aligned images for a subset of pixel locations that exhibit high cross-frame variation; performing learning processing to substantially reduce noise and exclude motion biases at the subset of pixel locations; performing pixel fusion from the series of aligned and processed images to produce the super-resolution reference image.

Selecting the series of images may include receiving the series of images through a communications network. Execution of the method may be performed on data that is one of stored, streamed, and a live feed. The computer program product may be further configured to provide output to an intelligent system.

In yet another embodiment, an imaging system is provided. The imaging system includes: a device configured to provide a series of images; non-transitory machine readable media including machine executable instructions for performing image enhancement stored thereon; and a processor configured to read the machine executable instructions and perform the image enhancement by: selecting the series of images; upscaling each image within the series of images; selecting a reference image among the series of images; performing image registration to align series of images with the reference image; evaluating the series of aligned images for a subset of pixel locations that exhibit high cross-frame variation; performing learning processing to substantially reduce noise and exclude motion biases at the subset of pixel locations; performing pixel fusion for the series of aligned and processed images to produce the super-resolution reference image.

The device configured to provide the series of images may include one of a smart phone, a camera, a tablet computer, a scanner, and a specialized device. Output of the imaging system may be configured for applications including, but not limited to: digital zoom in, image stabilization, video surveillance, medical image analysis, and image recognition.

BRIEF DESCRIPTION OF THE DRAWINGS

The features and advantages of the techniques herein are apparent from the following description taken in conjunction with the accompanying drawings in which.

DETAILED DESCRIPTION

Figure 1:
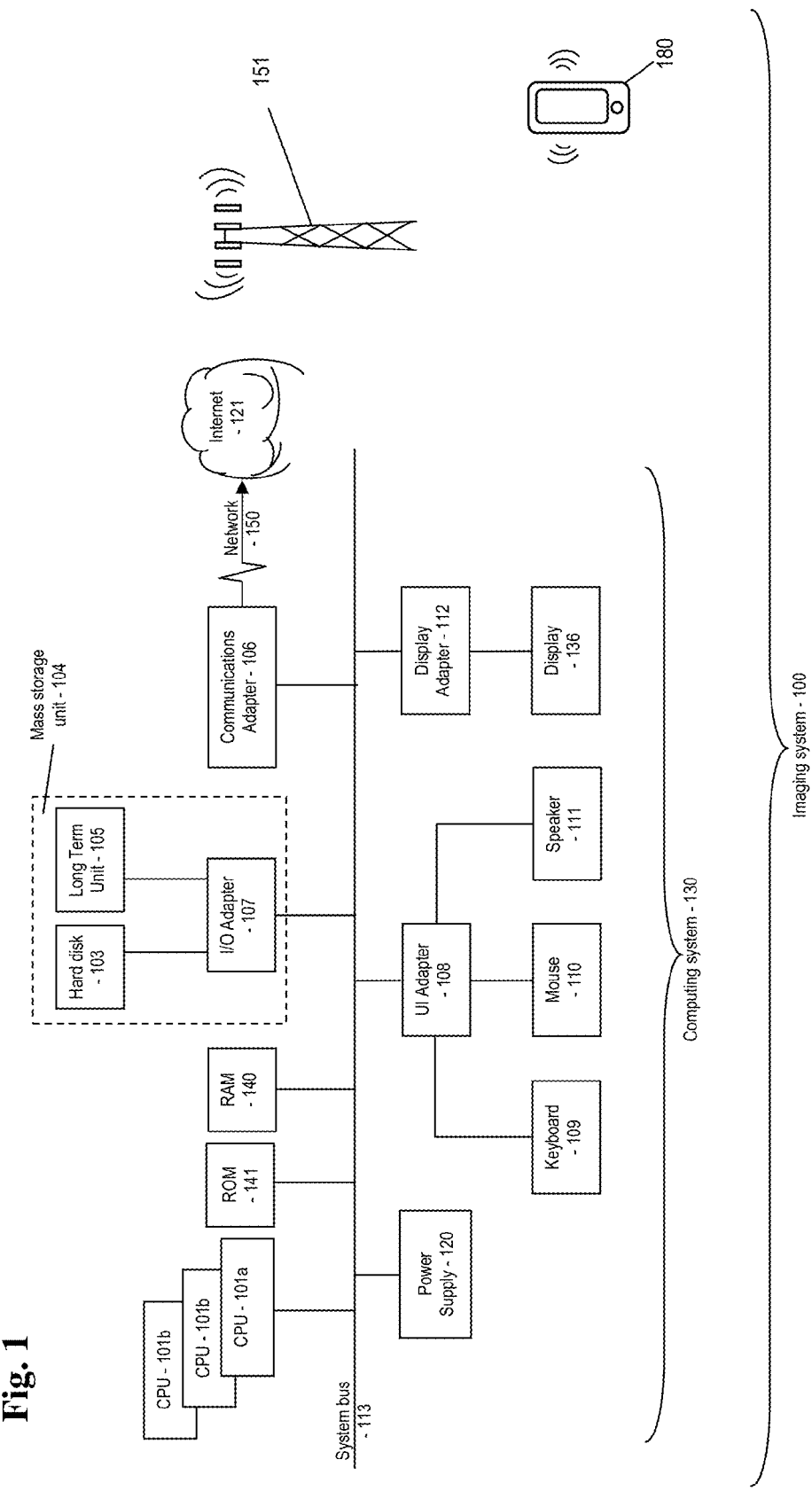
FIG. 1 is a block diagram of computing resources suited for performing super resolution enhancements of images as disclosed herein.

Disclosed herein are techniques for enhancement of image quality for a sequential series of images. More specifically, the techniques disclosed herein provide super-resolution (SR) enhancement of images, and effectively account for global as well as local motion within the sequential series of images. The techniques result in superior image quality, and thus enable users to access greater information contained within the images than has been available when applying prior art techniques.

The techniques disclosed herein are useful in a variety of industries and for a variety of tasks. Among other things, technology that requires quality imagery includes security surveillance, mapping, video tracking, motion tracking, robotic implementation, machine vision, environmental and wildlife surveillance, medical diagnostics, and others. Tasks that may be assisted by the techniques disclosed herein may include, for example, facial recognition, personnel identification, monitoring of a secured area, evaluation of diagnostic imagery such as x-rays, CT scans, medical resonance imaging (MRI) and other such techniques. The techniques disclosed herein may be used in real time (as data is generated) or to analyze previously stored data. Generally, the techniques disclosed herein may be used in a wide variety of industries, and for a wide variety of tasks.

In order to provide some context for the techniques herein, some aspects are now introduced.

As discussed herein, the term "image" refers to a two-dimensional array of digitized image data, however, this is merely illustrative and is not limiting. As discussed herein, each image is generally part of a sequential series of images. That is, each image may be considered as one frame from a series of frames that collectively make a video, or a movie, or other type of sequence. Each two-dimensional array contains a plurality of pixels. For example, an image may be 200 pixels in height, and 300 pixels wide (200×300). Generally, image size is limited merely by sensor is used to collect images, needs of the user, and by other similar constraints. The size of images that may be processed by the techniques disclosed herein may be varied. As discussed herein, the terms "video," "movie," and other similar terms generally refer to a series of images where each image within the series bears a visible and substantial relationship to the immediately preceding image, as well as the immediately following image (with exceptions, of course, for the beginning and the end of a series). In some embodiments, each series includes at least thirty (30) sequential frames.

The series of images selected for image enhancement may be stored, streamed, or a live feed. For example, the series of images may be provided to an image enhancing system on a data storage device such as a hard drive, an optical disk, in nonvolatile storage or other similar media. Data may be streamed to the image enhancing system through a communications channel, and may not necessarily be contemporaneous but may be derived from a prior event. Data may be a live feed, such as a series of images provided by a security system or other such device as the images are generated.

As discussed herein, an "object" or "feature" may appear in or be contained within an image. For example, a car (object) may appear within a picture (image) of a landscape (collection of objects). An example of the feature may include a line, a curve, and intensity, color, and other particular properties of within an image.

Generally, there are two types of motion that complicate traditional techniques for image enhancement. The term "global motion" generally refers to motion of the sensor used to collect the series of images. The term "local motion" generally refers to motion within the subject that is viewed by the sensor.

As discussed herein, the term "server" generally refers to a computing resource that has robust computational resources. Exemplary resources include those important for performing tasks described herein, and may include substantial memory, processing capabilities, data storage and the like. In exemplary embodiments, the server includes a conventional server (such as a blade server) a mainframe, a network of personal computers, or simply a personal computer (PC). A server may be remote from another device, such as a mobile device used for input. One example of an input device is a smartphone.

As discussed herein, the term "mobile device" generally refers to a resource that is configured for mobile use. Quite often, a device that is configured as a mobile device will have a reduced set of computational resources. Accordingly, various embodiments of mobile devices may maintain communication with a server to supplement computing capabilities. Examples of mobile devices include: a smart phone, a tablet computer, and/or a specialized device. A mobile device may also include a camera. In some embodiments, the camera is configured for real-time communication with the network. In some embodiments, the camera is configured with data storage for storing the sequential series of images.

As discussed herein, the term "client" generally refers to a computing resource that has a reduced set of computational resources. Exemplary resources include those important for performing tasks described herein, and may include a minimal amount of memory, processing capabilities, data storage and the like. In some embodiments, the client includes imaging capabilities to provide for collection of input images that are input into the neural network. In some embodiments, the client is configured for use on a mobile device and communicates with more robust, complimentary resources that operate on a remote server.

As discussed herein, the terms "program," "software," "application," "add-in," and other similar terms refer to machine executable instructions stored on non-transitory machine readable media. The machine executable instructions provide for execution of a method through control of computing resources and any associated components deemed appropriate.

Referring now to FIG. 1, aspects of an illustrative and non-limiting embodiment of an imaging system 100 are depicted. In this example, the imaging system 100 includes a computing system 130, a communications system 151, and at least one mobile device 180.

The computing system 130 may include one or more central processing units (processors) 101a, 101b, 101c, etc. (collectively or generically referred to as processor(s) 101). Processors 101 are coupled to random access memory (RAM) 140 (also referred to "system memory," or simply as "memory") and various other components via a system bus 113. The computing system 130 may include read only memory (ROM) 141 coupled to the system bus 113. The ROM 141 may include a built-in operating system (BIOS), which controls certain basic functions of computing system 130.

FIG. 1 further depicts an input/output (I/O) adapter 107 and a communications adapter 106 coupled to the system bus 113. The I/O adapter 107 generally provides for communicating with a hard disk 103 and/or long term storage unit 105 (such as a tape drive) or any other similar component (such as an optical drive). I/O adapter 107, hard disk 103, and long term storage unit 105 (and other similar components as may be included) are collectively referred to herein as mass storage 104.

A communications adapter 106 interconnects system bus 113 with an outside network 150 enabling server 130 to communicate with other systems. The communications adapter 106 may be supportive of at least of one of wired and wireless communication protocols. Generally, the communications adapter 106 communicates with network 15, and may communicate (directly or indirectly) with the Internet 121.

The server 130 is powered by a suitable power supply 120 such as a source of alternating current (AC) and/or a source of direct current (DC). Input/output devices are shown as connected to system bus 113 via user interface (UI) adapter 108. A keyboard 109, a pointing device 110 (e.g., a mouse), and speaker 111 may be included and interconnected to system bus 113 via user interface adapter 108. Other user interface components may be included as deemed appropriate.

A display adapter 112 connects display monitor 136 is connected to system bus 113. The display adapter 112 and/or display monitor may be configured with various components, such as a graphics adapter to improve the performance of graphics intensive applications, a video controller, a capacitive (i.e., touch screen) display, and the like. The display monitor 136 may be used to display the user interface 501.

In some embodiments, adapters 106, 107, 108 and 112 may be connected to one or more input/output (I/O) busses that are connected to system bus 113 via an intermediate bus bridge (not shown). Suitable I/O buses for connecting peripheral devices such as hard disk controllers, network adapters, and graphics adapters may include common protocols, such as the Peripheral Components Interface (PCI) bus. The computing system 130 may include additional components. The additional components may serve other functions as well.

The communications system 151 may be part of a third-party enterprise. For example, the communication system 151 may be a cellular service provider or other type of telephone, cable or fiber network. Generally, the communications system 151 provides for communication of data between the computing system 130 and the at least one mobile device 180.

The at least one mobile device 180 may include a device such as a smart phone. Illustrative embodiments of smartphone devices include the IPHONE from Apple Corp. of Cupertino, Calif., devices operating on the ANDROID platform of Google Corp. of Mountain View, Calif., as well as devices operating in the WINDOWS environment provided by Microsoft Corp. of Redmond, Wash. In illustrative embodiments, the at least one mobile device 180 includes components similar to those found in the computing system 130. For example, the at least one mobile device 180 includes at least one central processing unit (CPU). The central processing unit (CPU) is connected to or in communication with other components through an internal system bus. Examples of other components within the mobile device 180 include a power supply, memory, software, user controls, a display, a camera (that may be a front facing or a rear facing camera), a lamp, a communication interface, and may further include a variety of sensors such as an accelerometer, a gyroscope, a GPS receiver, a magnetometer and others.

The at least one mobile device 180 may be a camera. For example, when deployed as a camera, the at least one mobile device 180 may include substantial memory for storing data, may include additional sources of illumination, may include interchangeable lenses, and may have a number of user controls useful for configuring image capture.

Generally, the computing system 130 as well as the at least one mobile device 180 are configured to store machine readable instructions on non-transitory machine readable media (such as in ROM, RAM, or in the mass storage unit 104). The machine readable instructions (which may be referred to herein as "software," as an "application," as a "client, a "process," a "plug-in" and by other similar terms) generally provide for functionality as will be discussed in detail further herein.

In some embodiments, the machine readable instructions include drivers configured for communicating with other components. For example, the drivers may enable the computing system 130 to communicate with the camera and/or sensors of the mobile device 180.

Some of the machine readable instructions stored on non-transitory machine readable media may include an operating environment. For example, and as presented herein, a suitable operating environment is WINDOWS (available from Microsoft Corporation of Redmond Washington). Software as provided herein may be developed in, for example, SQL language, which is a cross-vendor query language for managing relational databases. Aspects of the software may be implemented with other software. For example, user interfaces may be provided in XML, HTML and the like.

A particular computer in the imaging system 100 may be purpose-oriented. For example, a computing infrastructure may use one computer principally as a file server (i.e., a data storage device for efficient storing of data within the computing infrastructure), a plurality of other computers as input devices (e.g., as mobile stations operated remotely by users for interfacing with the computing infrastructure), as a console (e.g., a dedicated system for managing the computing infrastructure), and the like.

It should be recognized that some functionality as may be described herein may be implemented by hardware (such as by the foregoing components), or by software, as appropriate. Accordingly, where reference is made to implementation in one manner or another, such implementation is merely illustrative and is not limiting of techniques described. In short, the foregoing description of the imaging system 100, and systems making use of the imaging system 100, merely provide an environment for the teachings herein and is not to be construed as limiting, but as illustrative of aspects of the imaging system 100.

Generally, the imaging system 100 implements a software solution that enables users to identify a series of images for enhancements, perform super resolution enhancements as described herein, and output enhanced images as appropriate. The imaging system 100 may implement third party software systems for various purposes, such as communications, messaging, graphics editing, statistical analyses, and for other such purposes.

Figure 2A:
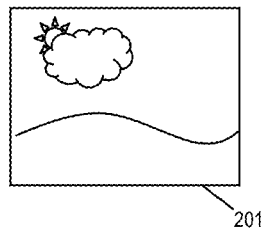
FIGS. 2A, 2B and 2C, collectively referred to herein as FIG. 2, are sequential diagrams depicting aspects of local motion within a series of images.
Figure 2B:
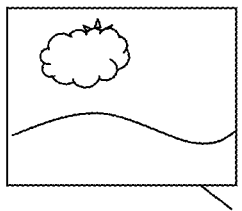
Figure 2C:
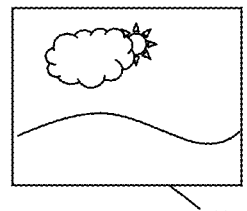

Refer now to FIG. 2 where a series of images 200 with local motion is shown. In this series of images, it assumes that the sensor (i.e., the camera) used for generating the images is maintained in a stationary position. That is, there is no global motion in this series. In FIG. 2A, a first frame 201 depicts the sun behind a cloud and to the left. In FIG. 2B, a second frame 202 depicts the sun behind the middle of the cloud. In FIG. 2C, a third frame 203 depicts the sun emerging from behind the cloud on the right side. This simple example depicts "local motion." That is, there is movement within a portion of each frame 201, 202, 203, while many other aspects remain statically positioned.

Figure 3A:
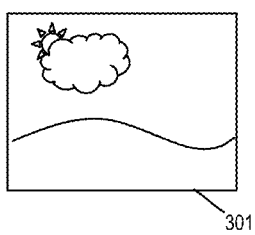
FIGS. 3A, 3B and 3C, collectively referred to herein as FIG. 3, are sequential diagrams depicting aspects of global motion for a series of images.
Figure 3B:
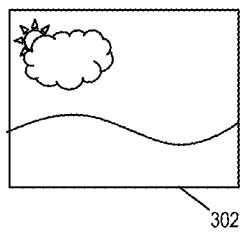
Figure 3C:
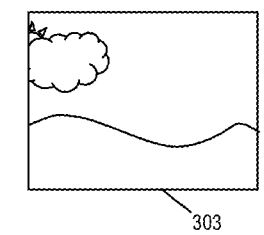

Refer now to FIG. 3 where a series of image 300 with global motion is shown. In this series of images, it assumes that the sensor (i.e., the camera) used for generating the images is not maintained in a stationary position. In addition, there is little or no local motion in this series. In FIG. 3A, a first frame 301 depicts the sun behind a cloud and to the left. In FIG. 3B, a second frame 302 depicts the sun behind the cloud into the left, however the entire scene has shifted to the right. In FIG. 3C, a third frame 303 depicts the sun behind the cloud into the left, however the entire scene has shifted even further to the right. This simple example depicts "global motion." That is, there is movement of each frame 301, 302, 303, while many the subject therein has remained relatively statically positioned.

As an overview, the techniques provide for multi-frame super resolution that is robust to local motion and/or global motion. Generally, the techniques proceed by registering images in local and/or global fashion. A scale-invariant feature transform (SIFT) flow algorithm may be employed to address local image registration. Aspects of the SIFT flow algorithm are disclosed in Ce Liu, Jenny Yuen and Antonio Torralba, "SIFT Flow: Dense Correspondence across Scenes and its Applications", IEEE Transactions on Pattern Analysis and Machine Intelligence, Vol. 33, No. 5, 2011, which is incorporated by reference herein in it's entirety.

Figure 4:
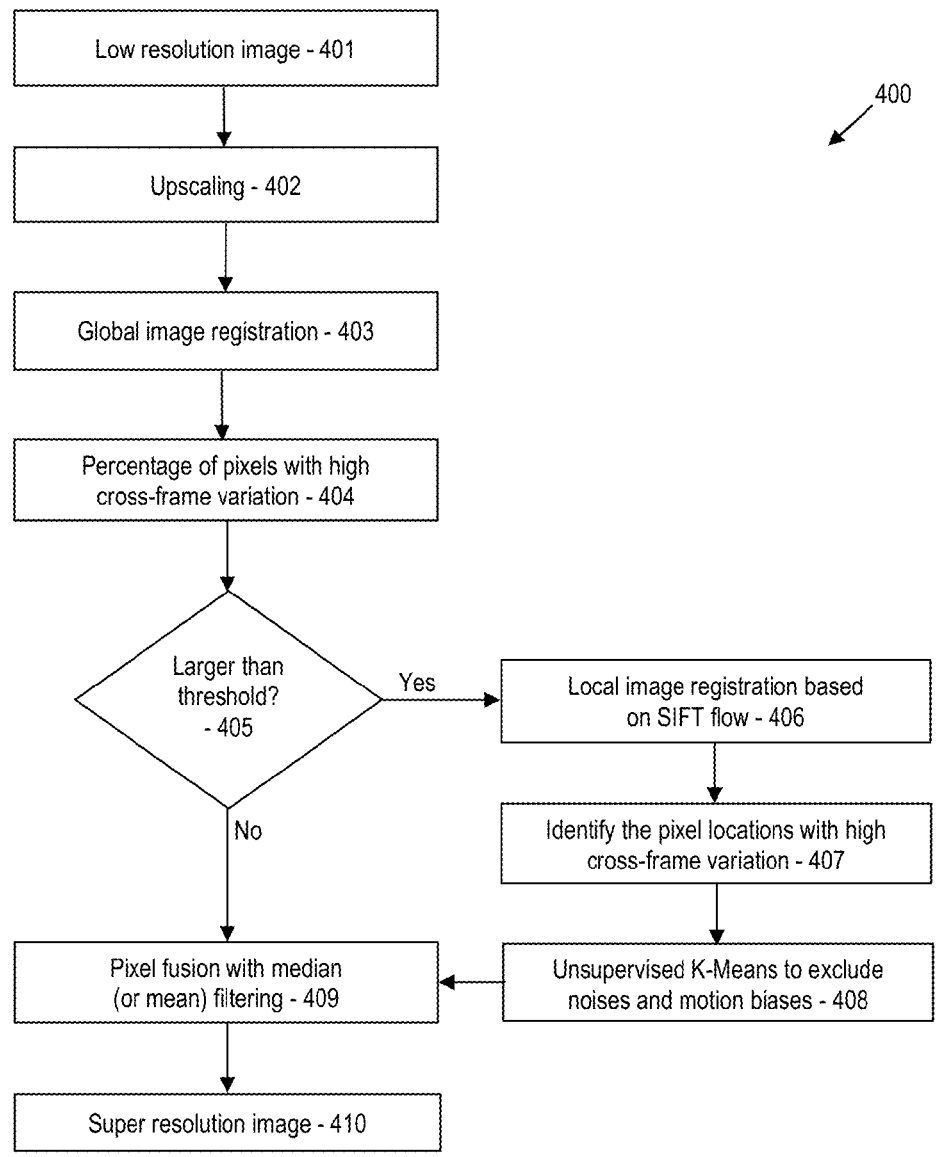
FIG. 4 is flow chart setting forth an embodiment of a method for performing super resolution enhancement of images.
Figure 5:
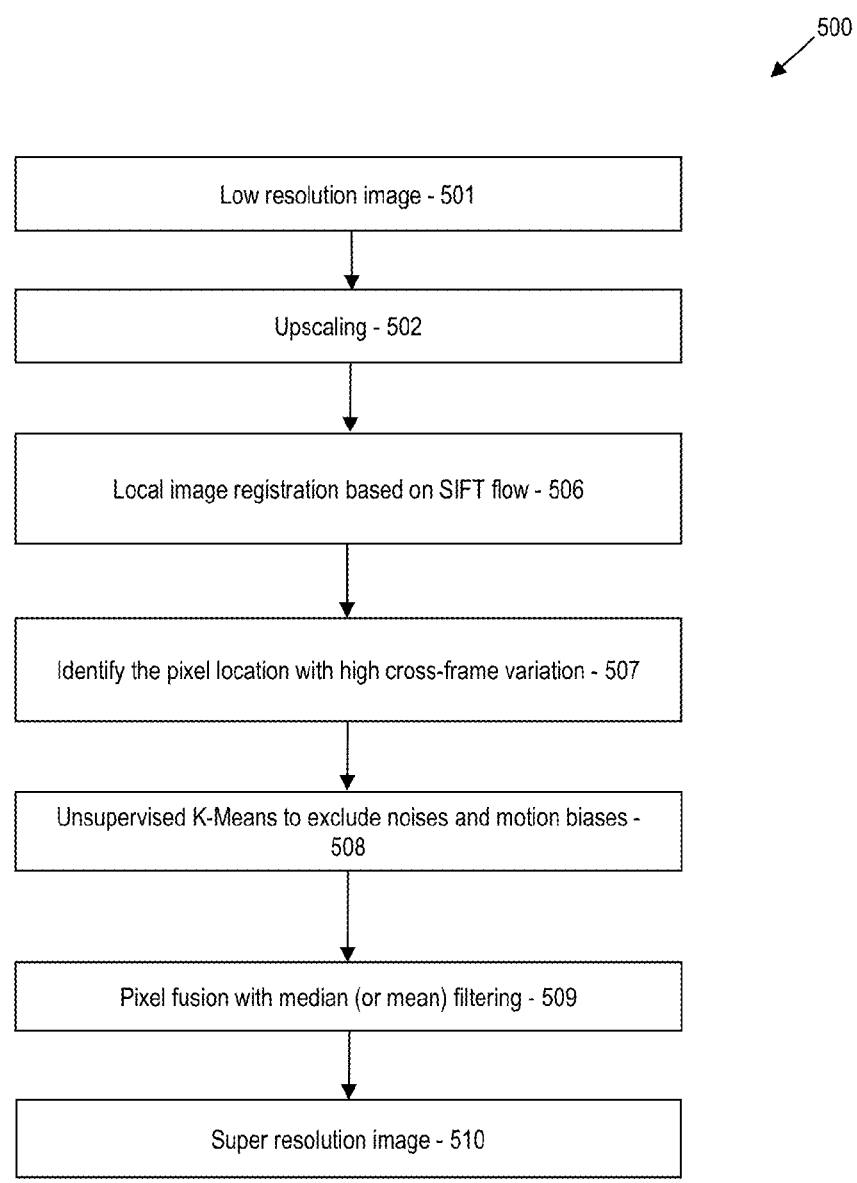
FIG. 5 is flow chart setting forth another embodiment of a method for performing super resolution enhancement of images.

Generally, after image registration, fusion of image frames is based on analysis of pixel distributions across frames to identify the area with potential motion blur; unsupervised learning of pixel values across frames to exclude noises and biases; and, median (or mean) filtering for the aligned and motion-exclusive pixels. FIGS. 4 and 5 provide flowcharts that depict non-limiting embodiments of the techniques.

Referring to FIG. 4, an example of process flow for super resolution is depicted in a first processing pipeline 400. In a first step 401, a series of images in low resolution is selected for processing. It should be noted that the term "low resolution" is with reference to final output, and is not meant to be compared to another standard. In this example, the low resolution image is 200×200 pixels. It should also be noted that each image within the series of images exhibits the same characteristics as the others. For example, each of the "low resolution" images will have a resolution that is 200×200 pixels. In a second step 402, upscaling is performed for each image within the series of images. Generally, in upscaling, the resolution of the image is changed. In this example, the low resolution image is adjusted from 200×200 pixels to an up-scaled image of 600×600 pixels. A variety of techniques may be used for creating data between the original pixels. One such technique is that of bicubic interpolation.

In a third step 403, global image registration is performed for a reference image selected within the series of images. In global image registration, other images within the sequence are aligned with the reference image. One technique for performing global image registration is that of photonic error minimization. In photonic error minimization, each of the pixels in the reference image is associated with corresponding pixels in a target image. A transformation matrix that enables such point-to-point correspondence is estimated as a result of global registration. In a fourth step 404, testing for existence of local motion is performed. In one example, cross-frame variations at all pixel location are computed and used as an indicator to the existence of local motion. In a fifth step 405, a percentage of high cross-frame variations is used as a decision maker on whether processing to local motion is in need. High cross-frame variation is defined by an empirical value, for example, in one implementation, high cross-frame variation is defined as 0.1 and above. If the percentage of high cross-frame variation exceeds a threshold value, then local motion processing is undertaken (to be discussed after global motion processing). If the cross-frame variation does not exceed the threshold value, then processing proceeds to a ninth step 409. In the ninth step 409, pixel fusion is performed. Pixel fusion may be performed with various types of filtering including median (or mean) or other types of filtering as deemed appropriate. In a tenth step 410, a super resolution image is provided. In this example, the super resolution image is 600×600 pixels.

Returning now to processing for local motion, where the percentage of high cross-frame variations has exceeded a threshold value, processing continues in a sixth step 406. In the sixth step 406, local image registration is completed. Local image registration may be based on scale-invariant feature transform (SIFT) flow algorithm. In a seventh step 407, pixel locations with high cross-frame variations are identified as areas with local motion. In an eighth step 408, processing is performed to exclude noises and motion biases for the pixel locations identified in the seventh step 407. Techniques for processing in the eighth step 408 may include, for example, unsupervised K-means processing. Once the eighth step 408 has been completed, the method proceeds to the ninth step 409.

It should be noted that various steps within the first processing pipeline 400 may be changed and/or adapted. For example, in one embodiment, global image registration is performed prior to upscaling. Generally, it is been found that the first processing pipeline 400 is more efficient if there is a limited amount of local motion within the series of frames, meaning that steps 406-408 can be skipped. A second embodiment, one example being provided in FIG. 5, may be more efficient where a considerable amount of local motion does exist within the series of frames.

Referring to FIG. 5, an example of process flow for super resolution is depicted in a second processing pipeline 500. In a first step 501, a series of low resolution images is selected for processing. It should be noted that the term "low resolution" is with reference to final output, and is not meant to be compared to another standard. In this example, the low resolution image is 200×200 pixels. It should also be noted that each image within the series of images exhibits the same characteristics as the others. For example, each of the "low resolution" images will have a resolution that is 200×200 pixels. In a second step 502, upscaling is performed for each image within the series of images. Generally, in upscaling, the resolution of the image is changed. In this example, the low resolution image is adjusted from 200×200 pixels to an up-scaled image of 600×600 pixels. A variety of techniques may be used for creating data between the original pixels. One such technique is that of bicubic interpolation.

In the second processing pipeline 500, it is assumed that a substantial amount of high cross-frame variations exists between images. High cross-frame variation is defined by an empirical value, for example, in one implementation, high cross-frame variation is defined as 0.1 and above. Accordingly, the fourth step 404 and the fifth step 405 of the first processing pipeline 400 are omitted.

Thus, processing continues in a sixth step 506. In the sixth step 506, local image registration is completed. Local image registration may be based on scale-invariant feature transform (SIFT) flow method. In a seventh step 507, pixel locations with high cross-frame variation are identified. In an eighth step 508, processing is performs to exclude noises and motion biases for the pixel locations identified in the seventh step 507. Techniques for processing in the eighth step 508 may include, for example, unsupervised K-means processing. Once the eighth step 508 has been completed, the method proceeds to the ninth step 509.

FIG. 6 depicts aspects of scale-invariant feature transform (SIFT) processing. Scale-invariant feature transform (SIFT) is an algorithm in computer vision to detect and describe local features in images. SIFT will transform pixels to a set of local descriptors based on orientation histogram of pixel gradient around a detected interest point. Dense SIFT proceeds without detecting an interest point and assigns keypoints densely over the image plane to derive SIFT local descriptors.

Figure 6A:
FIGS. 6A, 6B, and 6C, collectively referred to herein as FIG. 6, are illustrations regarding steps performed for scale-invariant feature transform (SIFT) processing.
Figure 6B:
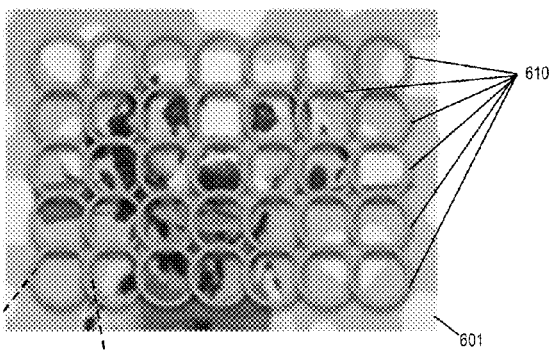
Figure 6C:
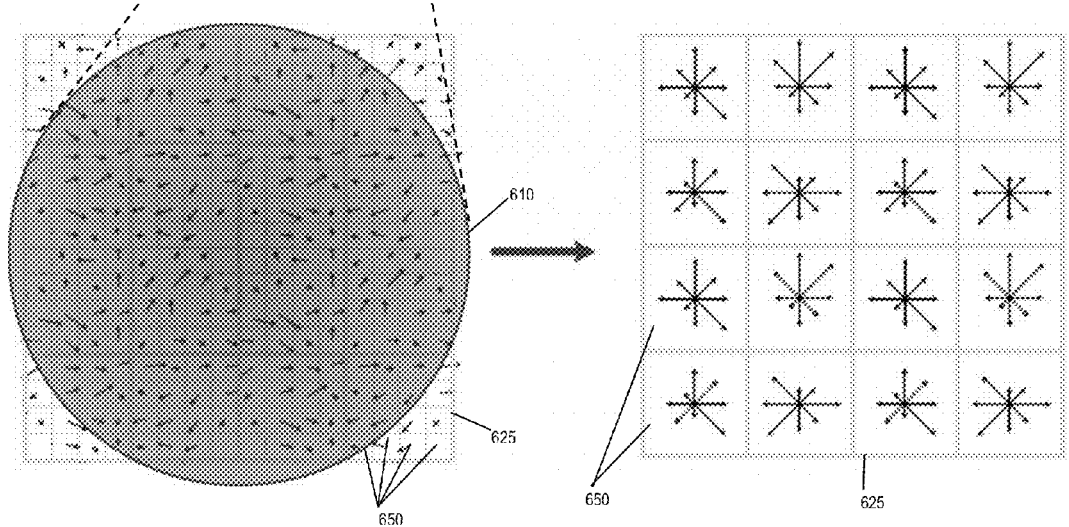
Figure 7A:
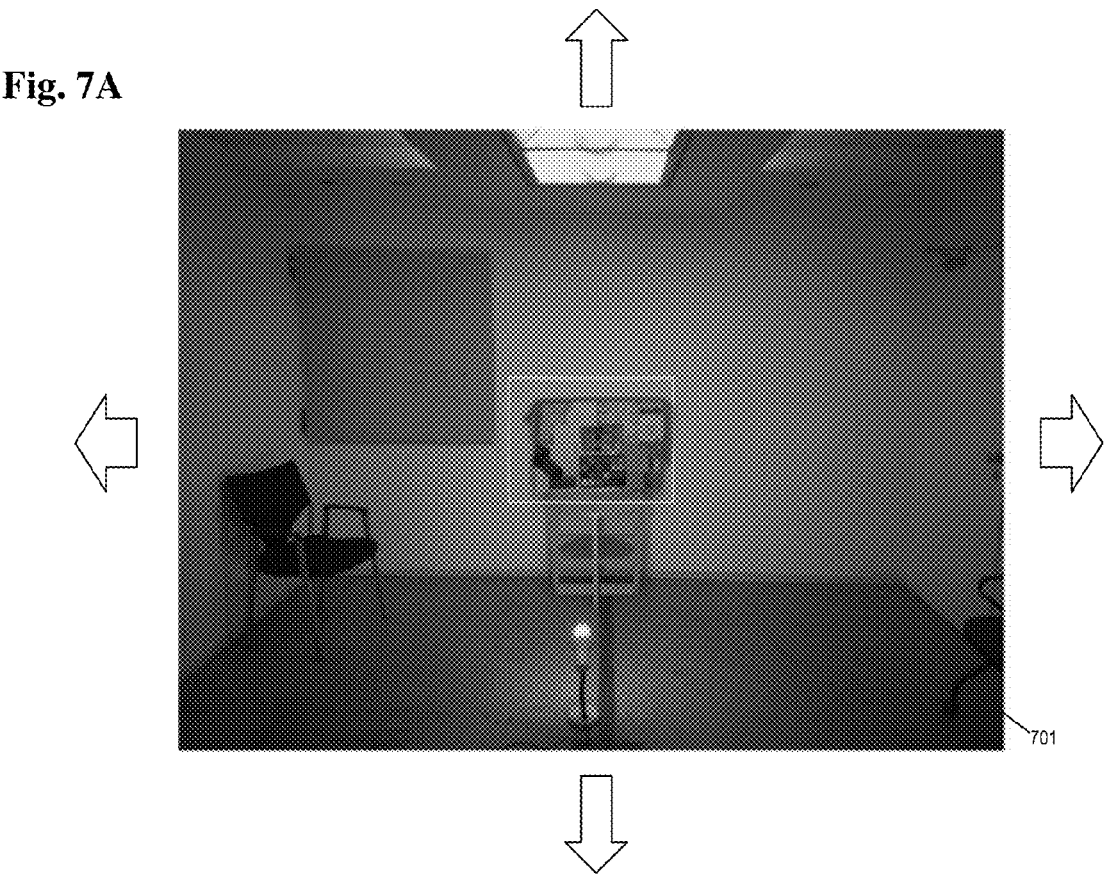
FIGS. 7A, 7B, 7C and 7D, collectively referred to herein as FIG. 7, are illustrations referenced for a description of image registration.
Figure 7B:
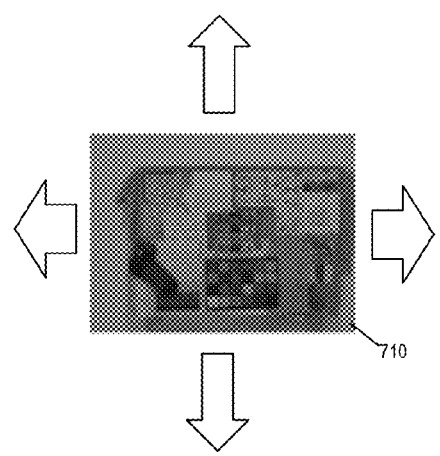
Figure 7C:
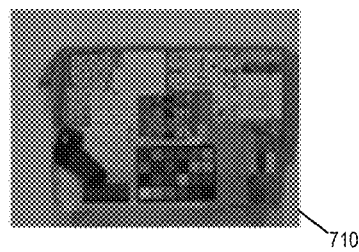
Figure 7D:
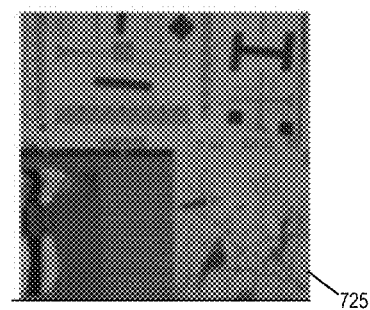

An illustrative example of an image 601 is provided in FIG. 6A. A plurality of dense keypoints 610 are shown distributed over the image 601 in FIG. 6B. A number of the local descriptors 650 (or "gradient features") are derived for each neighborhood 625, given the keypoint 610, as shown in FIG. 6C. As shown in the exploded view, the local descriptors 650 within each neighborhood 625 may include a plurality of vectors, each one being characterized by an orientation and a magnitude.

In order to provide for image registration, such as the local image registration of the sixth step 506 of the second processing pipeline 500, dense SIFT may be employed.

An algorithm of matching dense SIFT features of two images is called SIFT flow, deployed herein for local registration in this disclosure.

The energy function for flow for the SIFT function is set forth in Eq. (1) below. In this example, let p(x,y) be the grid coordinate for the sequence of images, and w(p)=(u(p),v(p)) be the flow vector at p. In Eq. (1), u(p) and v(p) are integers and it is assumed that there are L possible states for u(p) and v(p), respectively. Assuming that s1 and s2 are two dense SIFT images to be matched. Set c contains all the spatial neighborhoods (a four-neighbor system is used). The energy function for the SIFT flow is therefore defined as:

$$E(w) = \sum_p \min(\|s_1(p) - s_2(p + w(p))\|_1, t) + \sum_p \eta(|u(p)| + |v(p)|) + \sum_{(p,q)\in\varepsilon} \min(\alpha|u(p) - u(q)|, d) + \min(\alpha|v(p) - v(q)|, d), \quad (1)$$

Referring to FIG. 7, aspects of operation of an embodiment of the processing pipeline are depicted. In FIG. 7A, one image 701 is shown. The image 701 is actually one of a series of images. Global motion may exist between the series of images as indicated by the directional arrows. As may be seen in FIG. 7B, a cropped center image 710 may be selected from the image 701. Generally, the cropped center image 710 is reflective of an area of interest for a user. As with the larger image 701, the cropped center image 710 may be subject to global motion, as indicated by the directional arrows. In this example, the series of images has now been provided as a series of cropped center images 710. As shown in FIG. 7C, once global image registration has been performed, global motion is substantially eliminated. As shown in FIG. 7D, a portion of each image in the series of cropped center images 710 may be selected as an input image 725. In this example, each input image is 200×200 pixels. Subsequently, each input image is upscaled, in this example three times to 600×600 pixels.

Figure 8:
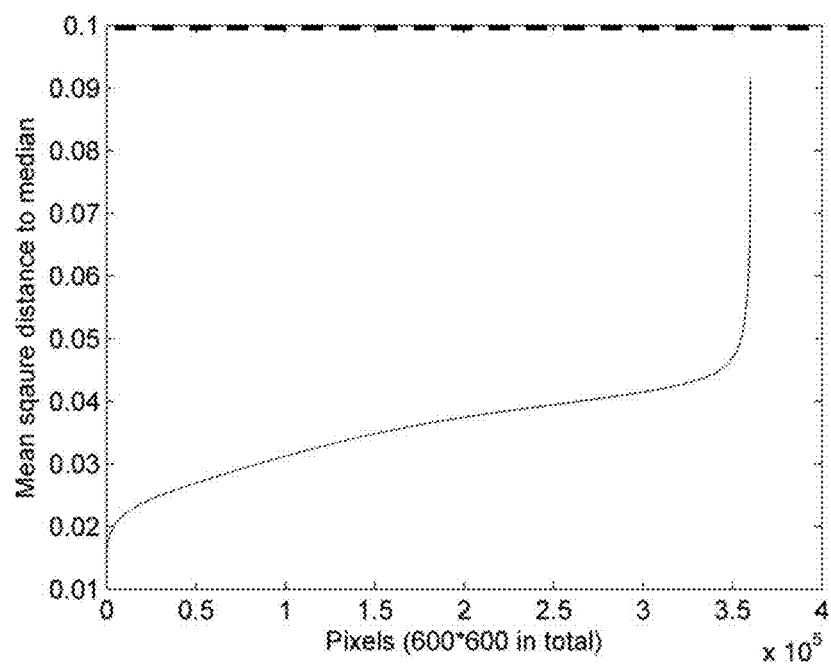
FIG. 8 is a graph depicting variation of luminance of pixels aligned at the same location, across fifty (50) image frames.

Given a series of registered and upscaled images depicted in FIG. 7, refer now to FIG. 8, where variation of the aligned pixels across the series of images is shown. The variations values are sorted in ascending order in FIG. 8 for all pixel locations (600×600 in total as presented in x axis). The curve of FIG. 8 shows across-frame pixel variation under the lab testing scene (as illustrated in FIG. 7), where only global motions are presented. In this example, variation is measured for the Y-channel (the luminous or brightness channel). Other color space characteristics may be used as deemed appropriate. The curve depicted in FIG. 8 shows that only a very limited number of pixels (less than two percent) exhibit a mean square distance to median that is larger than 0.1. Accordingly, there is no local motion detected within the series of upscaled images.

Consider now sequence of images that includes an outdoor scene. The sequence of images would generally include global motion (such as from movement of the camera), as well as local motion (such as from movement of tree foliage in the wind). In this example, it is preferable to proceed with the second processing pipeline 500 as outlined in FIG. 5. That is, in this example, global registration may be completed via an image transformation estimation, with local registration being based upon the SIFT flow method. Variation of the registered pixels across the series of images is depicted in FIG. 9.

Figure 9:
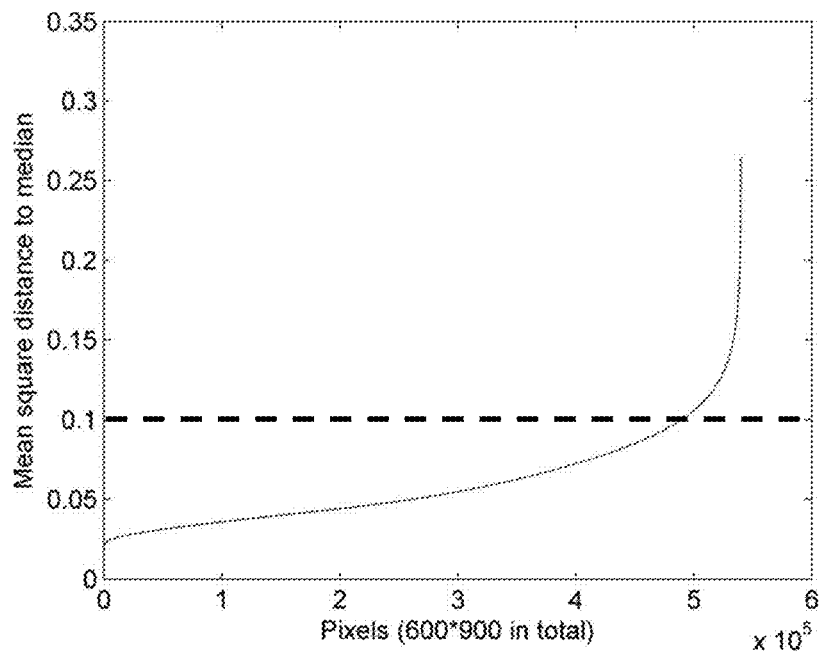
FIG. 9 is a graph depicting sorted variation of luminance of pixels aligned at the same location, across fifty (50) image frames.

Referring now to FIG. 9, variation of the aligned pixels across the series of images of the outdoor landscape described above is shown. The variations values are sorted in ascending order in FIG. 9 for all pixel locations (600×900 in total as presented along the x-axis). The curve of FIG. 9 shows across-frame pixel variation in an outdoor scene, where both local and global motions are presented. In this example, variation is measured for the Y-channel (or brightness). Other color space characteristics may be used as deemed appropriate. The curve depicted in FIG. 9 shows that over ten percent of the pixels exhibit a mean square distance to median that is larger than 0.1. Accordingly, local motion is detected within the series of up-scaled images.

The local motion results in blurs when fusing upscaled images for the high resolution image. The motion blur problem is solved herein via two steps. The first one is as described above to use dense SIFT features other than raw pixel intensity for the local image alignment and registration. The second one is as illustrated below to analyze the distribution of raw pixel intensities across the aligned upscaled images via interpolation, and identify the pixels with potential motion blur. Given the likelihood of motion blur, the upscaled frames used to do the fusion are adaptively selected. The selection is based on an unsupervised learning of pixel values aligned at the same position, so as to filter out noise and motion biases. One technique for unsupervised learning that is used is the K-means technique. K-means clustering is a method of vector quantization, originally from signal processing, that is popular for cluster analysis in data mining. K-means clustering aims to partition N observations into K clusters in which each observation belongs to the cluster with the nearest mean, serving as a prototype of the cluster.

Figure 10:
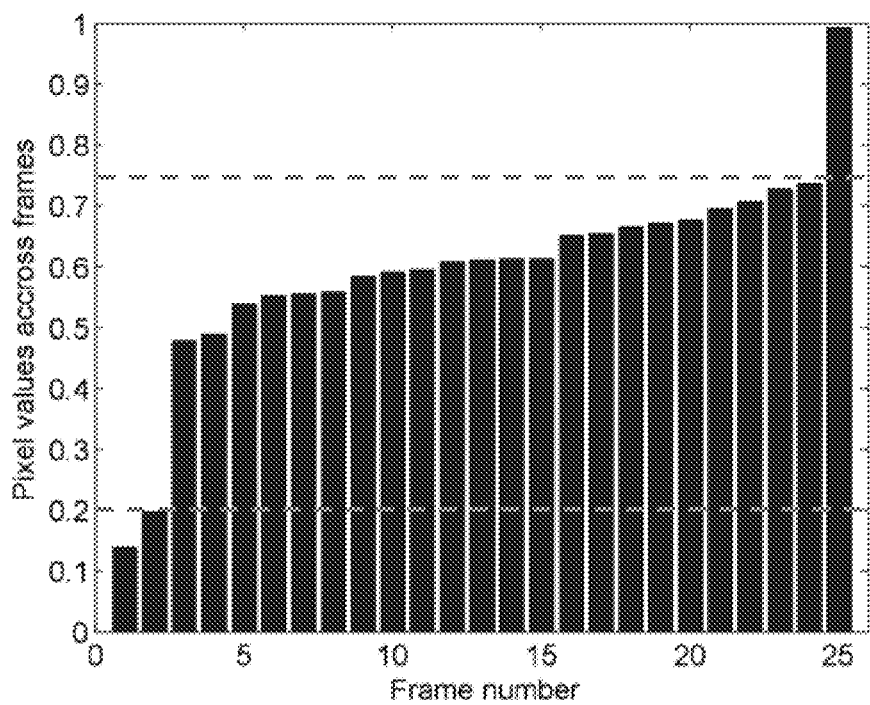
FIG. 10 is a graph illustrating the learning process to reduce noise and exclude motion biases of aligned pixels at a given location.

Referring now to FIG. 10, a histogram depicting the distribution of pixel values across the frames of the sequence of images is shown. In this example, pixels associated with values between about 0.2 and 0.75 are used for fusion. This results in images having substantial reductions in blur and increased sharpness (edge definition).

Figure 11:
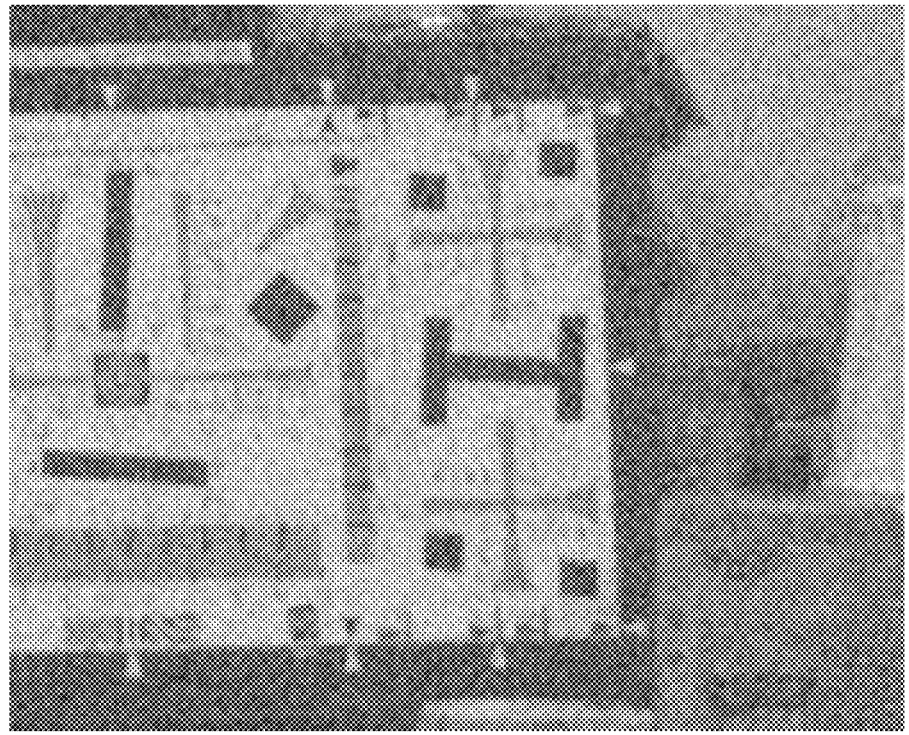
FIG. 11 is an illustration of an up-scaled image resulting from cubic interpolation under the lab testing scene, where mainly global motion is presented.
Figure 12:
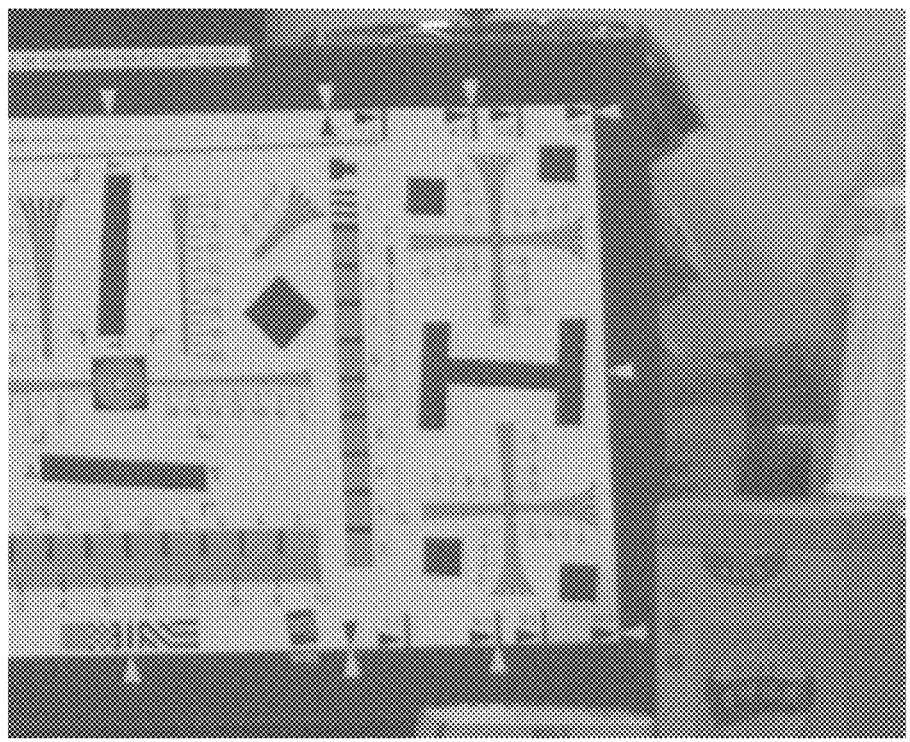
FIG. 12 is an illustration of the super resolution image resulted from all the disclosed techniques, under the same scene as FIG. 11.

Referring to FIGS. 11 and 12, an upscaled image via interpolation and the corresponding super resolution result are shown for the lab testing scene with global motion. The upscaled image (i.e., FIG. 11) is simply the result of three times cubic interpolation of the cropped center image 710. As may be seen, there is a substantial amount of speckle and dropouts in this image. FIG. 12 depicts the same center cropped image 710 after image processing according to the techniques disclosed herein. As can be seen, the result is a greatly improved image without any noticeable speckle or dropouts.

Figure 13:
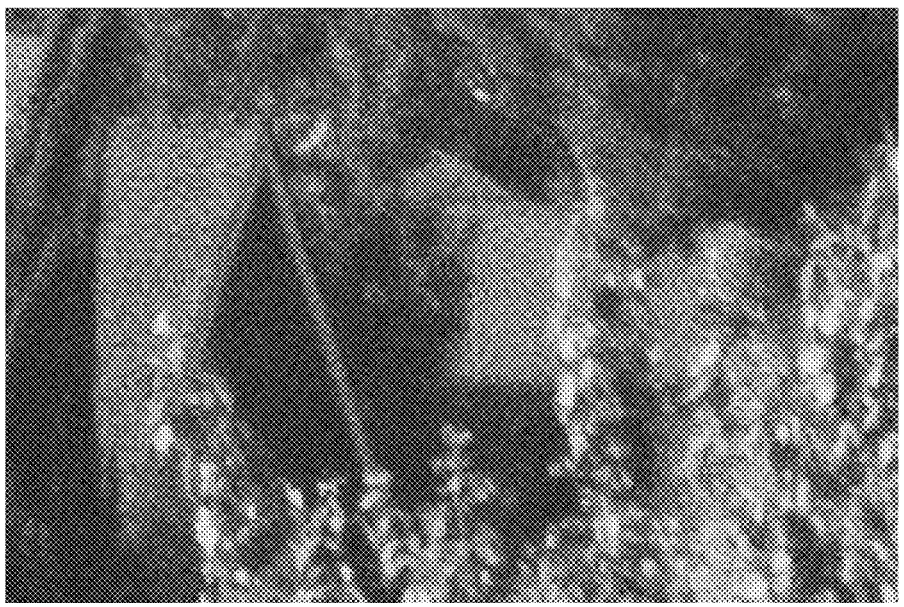
FIG. 13 is an illustration of an image resulting from cubic interpolation under an outdoor scene, where both local and global motions are presented.
Figure 14:
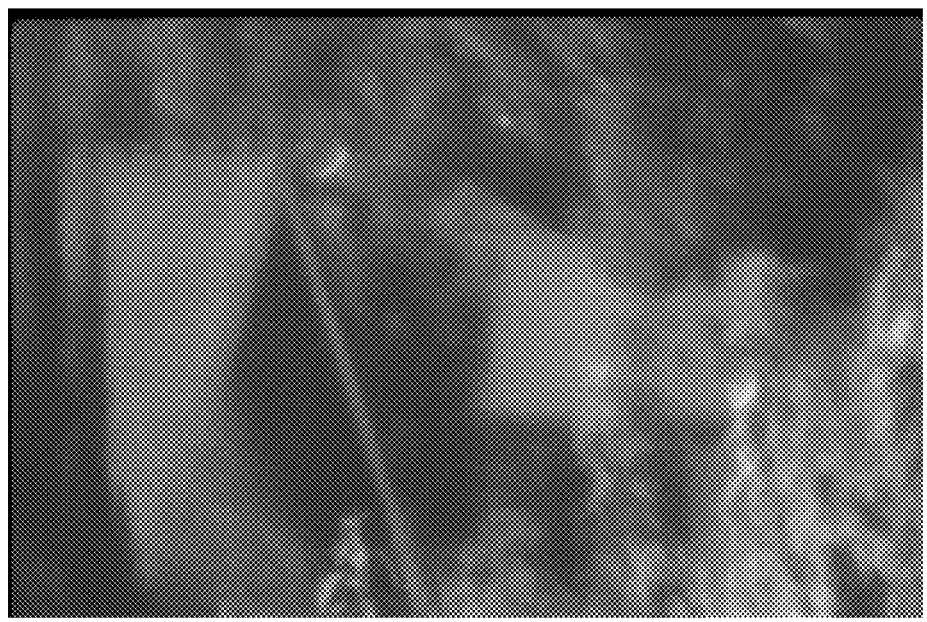
FIG. 14 is an illustration of the super resolution image resulted from the traditional global image registration and disclosed fusion technique, under the same scene as FIG. 13.
Figure 15:
FIG. 15 is an illustration of the super resolution image resulted from all the disclosed techniques, under the same scene as FIG. 13.

Referring to FIGS. 13, 14 and 15, aspects of the method are presented for images that contain local and global motion. In FIGS. 13, 14 and 15, an up-scaled image is provided, with the corresponding super resolution result from global registration and fusion of frames, and the corresponding super resolution result of produced according to the disclosed techniques. The up-scaled image (FIG. 13) is the result of three times cubic interpolation of a cropped image captured outdoors. As may be seen, there is a substantial amount of speckle and dropouts in this image. The super resolution image (FIG. 14) is the result from the global image registration followed by fusion, without special treatment for local motion. As may be seen, there is a substantial amount of motion blurs in this image. The resulting super resolution image (FIG. 15) is generated according to the disclosed techniques dealing with both local and global motion. As can be seen, the result is a greatly improved image without any noticeable speckle or dropouts, and much less motion blurs.

Having thus introduced embodiments of image enhancement techniques, some additional aspects and features are now presented.

In some embodiments, output of the imaging system 100 may be received by another system, such as a convolutional neural network configured for object recognition. A subsequent system such as those for object recognition, image analysis, and facilitation of image analysis are referred to herein as an "intelligent system." Generally, the intelligent system receives output from the imaging system 100 and uses the enhanced images to provide additional functionality.

As discussed herein, the term "correlated" with regards to pixels generally refers to a location of a pixel within a reference frame in the sequence of images, and that corresponding pixel in the following images. Where image registration is performed, pixels should be well correlated. For example, where there is no global motion or local motion, and for a noiseless image sensor, each pixel within the first image should correlate perfectly with subsequent images from the sequence of images. Of course, where there is global motion or local motion, as well as noise within an image sensor, correlation of pixels between frames is not perfect. In the case of a sequence of images where only global motion exists, pixels from the reference frame may be correlated (or associated) with pixels from a target frame by analyzing each of the pixels. For example, pixels may be correlated by enforcing the same transformation where differences in properties such as luminosity are at a minimum. Stated another way, in the global motion case, the reference image may be aligned with (or registered with) the target image when all the pixels from the reference image are well correlated with the pixels of the target image.

Accordingly, where pixels in one image do not correlate well with pixels in other images by applying a global transformation, this is considered indicative of local motion. That is, where high cross-frame variation exists, local motion is indicated.

As discussed herein, the term "pixel fusion" generally refers to techniques for combining and/or refining multiple pixels representing the same information or scene. Since upscaling is based on pixel interpolation, where actual data between pixels is estimated but does not exist. The process of fusing the registered upscaled images is to provide for refining estimates of what the actual data should have been. Accordingly, pixel fusion applies on the multiple image outputs after image registration and upscaling, and may apply techniques such as median filtering, mean filtering, interpolation and the like.

Generally, techniques for super-resolution disclosed herein are most efficient where at least thirty images are included in a sequential series of images. However, this is not a requirement. For example, the techniques disclosed herein may provide for enhancement of images where as few as two sequential images are included within the series of images.

As discussed herein, the term "noise" generally refers to spurious data included in at least one image. Noise may be random or systematic. For example, random noise may include lost data such as may arise from a burst of static electricity within the image sensor. Systematic noise may include, for example, a dead pixel within a sensor, and therefore missing data in the same location for each image. These types of imaging problems and others are broadly classified as noise for purposes of discussion herein.

Various other components may be included and called upon for providing for aspects of the techniques herein. For example, additional materials, combinations of materials and/or omission of materials may be used to provide for added embodiments that are within the scope of the teachings herein.

When introducing elements of the disclosed subject matter or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the techniques herein have been described with reference to exemplary embodiments, it will be understood by those skilled in the art that various changes may be made and equivalents may be substituted for elements thereof while remaining within the scope of this disclosure. In addition, many modifications will be appreciated by those skilled in the art to adapt a particular instrument, situation or material to the teachings without departing from the essential scope thereof. Therefore, it is intended that the technology disclosed is not to be limited to the particular embodiment disclosed as the best mode contemplated, but that the technology will include all embodiments falling within the scope of the appended claims.

What is claimed is:

1. A method for providing a super-resolution image within a series of images, the method comprising:
   selecting the series of images;
   upscaling each image within the series of images;
   selecting a reference image among the series of images;
   performing image registration to align the series of images with the reference image;
   evaluating the series of aligned images for a subset of pixel locations that exhibit high cross-frame variation;
   performing learning processing to substantially reduce noise and exclude motion biases at the identified subset of pixel locations;
   performing pixel fusion for the series of aligned and processed images to produce the super-resolution image.

2. The method as in claim 1, wherein the series of images comprises two or more sequential images.

3. The method as in claim 1, wherein image registration comprises correlating at least some of the pixels of the reference image with at least some of the pixels of another image.

4. The method as in claim 1, wherein image registration comprises comparing at least one property of the selected pixels from the reference image with at least one property of the selected pixels from the another image.

5. The method as in claim 4, wherein the at least one property of the selected pixels includes a scale-invariant feature (SIFT) transform.

6. The method as in claim 1, wherein performing learning processing comprises assigning a plurality of keypoints to each image in the series of images.

7. The method as in claim 1, wherein performing image registration comprises processing with the SIFT flow algorithm.

8. The method as in claim 1, wherein evaluating the series of aligned images for a subset of pixel locations that exhibit high cross-frame variation comprises determining a deviation of pixels aligned at each location, and comparing the result to a threshold value.

9. The method as in claim 8, wherein the deviation comprises a mean square distance to the median of one or more pixel channels.

10. The method as in claim 9, wherein the deviation comprises a mean square distance to median for each of the local descriptors.

11. The method as in claim 1, wherein the learning processing comprises performing unsupervised K-means processing.

12. The method as in claim 1, wherein performing image registration comprises processing an energy function for a scale-invariant feature transform (SIFT) that comprises:

$$E(w) = \sum_p \min(\|s_1(p) - s_2(p + w(p))\|_1, t) + \sum_p \eta(|u(p)| + |v(p)|) + \sum_{(p,q) \in \varepsilon} \min(\alpha|u(p) - u(q)|, d) + \min(\alpha|v(p) - v(q)|, d),$$

wherein
p(x,y) represents the grid coordinate for the series of images; and
w(p)=(u(p),v(p)) represents the flow vector at p; and,
wherein
u(p) and v(p) are integers and there are L possible states for u(p) and v(p), respectively; assuming that s1 and s2 are two dense SIFT images to be matched and set c contains all of the spatial neighborhoods in a four-neighbor system.

13. The method as in claim 1, wherein performing pixel fusion comprises at least one of median filtering and mean filtering across frames of images within the series of images.

14. A computer program product stored on non-transitory machine readable media, the computer program product comprising machine executable instructions for implementing a neural network by executing a method for producing a super-resolution reference image within a series of images, the method comprising:
   selecting the series of images;
   upscaling each image within the series of images;
   selecting a reference image among the series of images;
   performing image registration to align the series of images with the reference image;

evaluating the series of aligned images for a subset of pixel locations that exhibit high cross-frame variation;

performing learning processing to substantially reduce noise and exclude motion biases at the identified subset of pixel locations;

performing pixel fusion from the series of aligned and processed images to produce the super-resolution reference image.

15. The computer program product as in claim 14, wherein the selecting comprises receiving the series of images through a communications network.

16. The computer program product as in claim 14, wherein executing the method is performed on data that is one of stored, streamed, and a live feed.

17. The computer program product as in claim 14, further configured to provide output to an intelligent system.

18. An imaging system, comprising:

a device configured to provide a series of images;

non-transitory machine readable media comprising machine executable instructions for producing a super-resolution reference image, the instructions stored thereon; and a processor configured to read the machine executable instructions and perform the image enhancement by:

selecting the series of images;

upscaling each image within the series of images;

selecting a reference image among the series of images;

performing image registration to align the series of images with the reference image;

evaluating the series of aligned images for a subset of pixel locations that exhibit high cross-frame variation;

performing learning processing to substantially reduce noise and exclude motion biases at the identified subset of pixel locations;

performing pixel fusion from the series of aligned and processed images to produce the super-resolution reference image.

19. The imaging system as in claim 18, wherein the device configured to provide the series of images comprises one of a smart phone, a camera, a tablet computer, a scanner, and a specialized device.

20. The method as in claim 18, wherein output of the imaging system is configured for at least one of: digital zoom in, image stabilization, video surveillance, medical image analysis, and image recognition.

* * * * *